United States Patent
Ko

(10) Patent No.: US 9,603,032 B2
(45) Date of Patent: Mar. 21, 2017

(54) SYSTEM AND METHOD FOR AUTOMATICALLY MEASURING UPLINK NOISE LEVEL OF DISTRIBUTED ANTENNA SYSTEM

(71) Applicant: ADVANCED RF TECHNOLOGIES, INC., Burbank, CA (US)

(72) Inventor: Young-Hoon Ko, Icheon (KR)

(73) Assignee: ADVANCED RF TECHNOLOGIES, INC., Burbank, CA (US)

( * ) Notice: Subject to any disclaimer, the term of this patent is extended or adjusted under 35 U.S.C. 154(b) by 44 days.

(21) Appl. No.: 13/831,508

(22) Filed: Mar. 14, 2013

(65) Prior Publication Data

US 2013/0337750 A1    Dec. 19, 2013

Related U.S. Application Data

(60) Provisional application No. 61/659,761, filed on Jun. 14, 2012.

(51) Int. Cl.

| | |
|---|---|
| *H04W 24/00* | (2009.01) |
| *H04B 7/02* | (2006.01) |
| *H04W 24/04* | (2009.01) |
| *H04W 88/08* | (2009.01) |
| *H04B 17/23* | (2015.01) |
| *H04B 17/345* | (2015.01) |

(52) U.S. Cl.
CPC ............ *H04W 24/00* (2013.01); *H04B 7/024* (2013.01); *H04B 17/23* (2015.01); *H04B 17/345* (2015.01); *H04W 24/04* (2013.01); *H04W 88/085* (2013.01)

(58) Field of Classification Search
CPC ..... H04W 24/00; H04W 24/04; H04W 24/02; H04B 7/024; H04B 7/0691; H04B 7/0874; H04B 7/0808; H04B 1/707; H04B 7/0413; H04B 7/216; H04B 7/2628; H04L 1/0026; H03D 3/008
See application file for complete search history.

(56) References Cited

U.S. PATENT DOCUMENTS

| | | | | |
|---|---|---|---|---|
| 8,488,727 | B1* | 7/2013 | Feng et al. ................... | 375/347 |
| 8,774,153 | B1* | 7/2014 | Vargantwar et al. ......... | 370/342 |
| 2006/0276132 | A1* | 12/2006 | Sheng-Fuh et al. ......... | 455/41.2 |
| 2007/0072571 | A1* | 3/2007 | Sun et al. ..................... | 455/280 |
| 2009/0215480 | A1* | 8/2009 | Kim et al. .................... | 455/501 |
| 2010/0296816 | A1* | 11/2010 | Larsen .......................... | 398/116 |
| 2011/0244785 | A1* | 10/2011 | Scheinert ..................... | 455/3.05 |
| 2013/0260706 | A1* | 10/2013 | Singh ............................ | 455/257 |

OTHER PUBLICATIONS

Motorola, WiNG 4.4 system reference guide, Jan. 2012 http://www.michaelfmcnamara.com/files/motorola/15706201a.pdf.*

* cited by examiner

*Primary Examiner* — Ping Hsieh
*Assistant Examiner* — James Yang
(74) *Attorney, Agent, or Firm* — Lewis Roca Rothgerber Christie LLP

(57) ABSTRACT

A method of automatically measuring noise levels of a plurality of uplink paths in a Distributed Antenna System (DAS) includes: sequentially measuring a noise level of each uplink path of the plurality of uplink paths; extracting the noise level of each uplink path at a final end of the uplink path; detecting the noise level of each uplink path; and determining a status of each uplink path by comparing the detected noise level with a threshold value.

17 Claims, 3 Drawing Sheets

SYSTEM AND METHOD FOR AUTOMATICALLY MEASURING UPLINK NOISE LEVEL OF DISTRIBUTED ANTENNA SYSTEM

CROSS-REFERENCE TO RELATED APPLICATION

This non-provisional application claims priority to and the benefit of U.S. Provisional Application No. 61/659,761, filed Jun. 14, 2012, the entire content of which is incorporated herein by reference.

BACKGROUND

Technical Field

The present invention relates generally to a method of automatically analyzing (e.g., measuring) an uplink path of a Distributed Antenna System (DAS). More particularly, the invention relates to a system and method for automatically measuring an uplink noise level of a DAS, measuring the noise level of each Remote Unit (RU) link of a plurality of RU links, at the final end of an uplink path, and then using the noise level to check the status of the uplink path of the DAS.

Description of Related Art

In general, a DAS includes a Base Station Transceiver Subsystem (BTS), a Head End (HE), and a plurality of Remote Units (RUs). The DAS may be located in (or placed in) shadow areas that radio waves generally cannot reach, such as a large-sized building, a campus, a stadium, a hospital and/or a tunnel. Signals of the BTS may be amplified so that the signals can reach the shadow areas.

The DAS may also function to amplify signals requested by terminals located in (or placed in) the shadow areas and then transmit the amplified signals in a direction opposite to the above-described relay direction. For example, a signal transmitted by a user terminal may be transmitted over an uplink path from the user terminal to a BTS/Bi-Directional Amplifier (BTS/BDA). The signal transmitted by the user terminal is first input to an RU located in (or placed in) a corresponding service area. The input signal is amplified with an appropriate gain via the RU, converted into an optical signal, and then transmitted to an HE over an optical cable. The HE converts the optical signal into a Radio Frequency (RF) signal, amplifies the converted signal with an appropriate gain, and sends the amplified signal to the BTS/BDA.

However, after being installed and while operating, a conventional DAS may not be able to check the status of an uplink path. For example, the DAS may not be able to check for conditions such as a deteriorated gain status of an uplink path, self-oscillations attributable to the influence of an antenna of a specific RU uplink, or an inflow of external spurious signals. In such cases, it may only be possible to take measurements at the point when a terminal user senses a deterioration of quality and makes a complaint.

Furthermore, a conventional DAS may be problematic in that, in the case where a plurality of RUs is installed, two or more persons may be needed to check the status of an uplink path. That is, one person may have to check the status of an uplink path at a HE using a measuring device and another person may have to visit each of the RUs, detach an antenna from the RU, perform electrical termination processing (e.g., 50 ohm termination processing), and then check the status of each RU while communicating with the person located at (or placed at) the HE. Accordingly, there may be problems in that measurements relating to the status of an RU cannot be taken promptly and the status of an RU cannot be checked in an area where the RU is inaccessible to people.

It is therefore desirable to provide a system and method for automatically analyzing (e.g., measuring) an uplink path of a DAS.

SUMMARY

Accordingly, embodiments of the present invention are provided in view of the above issues. An aspect of the present invention is to provide a system and method for automatically measuring an uplink noise level of a DAS. A system and method according to embodiments of the present invention are capable of detecting an uplink noise level in the full band for each RU, then checking whether or not there is a problem with an uplink path for each RU, and identifying what problem, if any, has occurred.

In accordance with an aspect of the present invention, a method of automatically measuring noise levels of a plurality of uplink paths in a Distributed Antenna System (DAS) includes: sequentially measuring a noise level of each uplink path of the plurality of uplink paths; extracting the noise level of each uplink path at a final end of the uplink path; detecting the noise level of each uplink path; and determining a status of each uplink path by comparing the detected noise level with a threshold value.

The extracting the noise level of each uplink path may include: coupling the noise levels of the plurality of uplink paths; and amplifying the coupled noise levels to a measurable level and filtering the amplified noise levels.

The detecting the noise level of each uplink path may include: measuring the extracted noise levels; and reporting the measured noise levels.

The method may further include displaying the reported noise levels.

The reported noise levels may be displayed via a Graphic User Interface.

The determining the status of each uplink path may include: comparing the detected noise level with an upper limit threshold value, and determining that the uplink path is abnormal if the detected noise level exceeds the upper limit threshold value, and determining that the uplink path is normal if the detected noise level does not exceed the upper limit threshold value.

The determining the status of each uplink path may include: comparing the detected noise level with a lower limit threshold value, and determining that the uplink path has an abnormal reduced gain if the detected noise level is less than the lower limit threshold value, and determining that the uplink path has a normal reduced gain if the detected noise level is not less than the lower limit threshold value.

The comparing the detected noise level with the upper limit threshold value may include: determining an external spurious signal input status or a self-oscillation status if an input switch on an input side of the uplink path is coupled to an antenna path of an external signal and the detected noise level exceeds the upper limit threshold value; and determining an internal spurious abnormal status if the input switch is uncoupled from the antenna path and the detected noise level exceeds the upper limit threshold value.

The determining the external spurious signal input status or the self-oscillation status may include: lowering an uplink gain of the DAS by an offset; comparing the noise level with a comparison value obtained by reducing the upper limit threshold value by the offset; and determining the external spurious signal input status if the noise level is higher than the comparison value and determining the self-oscillation status if the noise level is not higher than the comparison value.

The method may further include: generating an external spurious input alarm if the status of the uplink path is determined to be the external spurious signal input status; and generating a self-oscillation alarm if the status of the uplink path is determined to be the self-oscillation status.

Each of the uplink paths may correspond to a remote unit (RU) of the DAS, and the method may further include switching off power of the corresponding RU when the external spurious input alarm or the self-oscillation alarm is generated.

The method may further include generating an uplink low gain alarm if the uplink path is determined to have the abnormal reduced gain.

Each of the uplink paths may correspond to a remote unit (RU) of the DAS, and the method may further include switching off power of the corresponding RU after the uplink low gain alarm is generated.

The method may further include: receiving a request to measure the noise level of an uplink path of the plurality of uplink paths; automatically measuring the noise level in real time; and reporting the measured noise level.

The noise levels may be automatically measured and reported periodically according to a time cycle or at a specific time.

The sequentially measuring the noise level of each uplink path may include switching on an uplink path to be measured and switching off the other uplink paths of the plurality of uplink paths.

According to another aspect of the present invention, a Distributed Antenna System (DAS) includes a switch configured to independently control switching on or off of uplink connection links between a plurality of remote units (RUs) and a head end of the DAS; a coupler configured to couple a plurality of uplink noise signals of the uplink connection links, at a final end of an uplink path of the DAS; a low noise amplifier (LNA) configured to perform low-noise amplification of the uplink noise signals coupled by the coupler; a bandpass filter configured to filter the amplified noise signals received from the LNA; a detector configured to detect the noise signals received from the LNA and the BPF; and a control unit configured to determine a status of the uplink connection links. Each of the RUs includes an input switch configured to switch on or off a connection between the RU and an antenna for receiving an external signal.

The DAS may further include an alarm generation unit configured to generate an alarm when a status of the uplink path is an abnormal status, and a power switch configured to switch off the alarm.

BRIEF DESCRIPTION OF THE DRAWINGS

The above and other aspects and features of the present invention will be more clearly understood from the following detailed description taken in conjunction with the accompanying drawings, in which.

DETAILED DESCRIPTION

Figure 1:
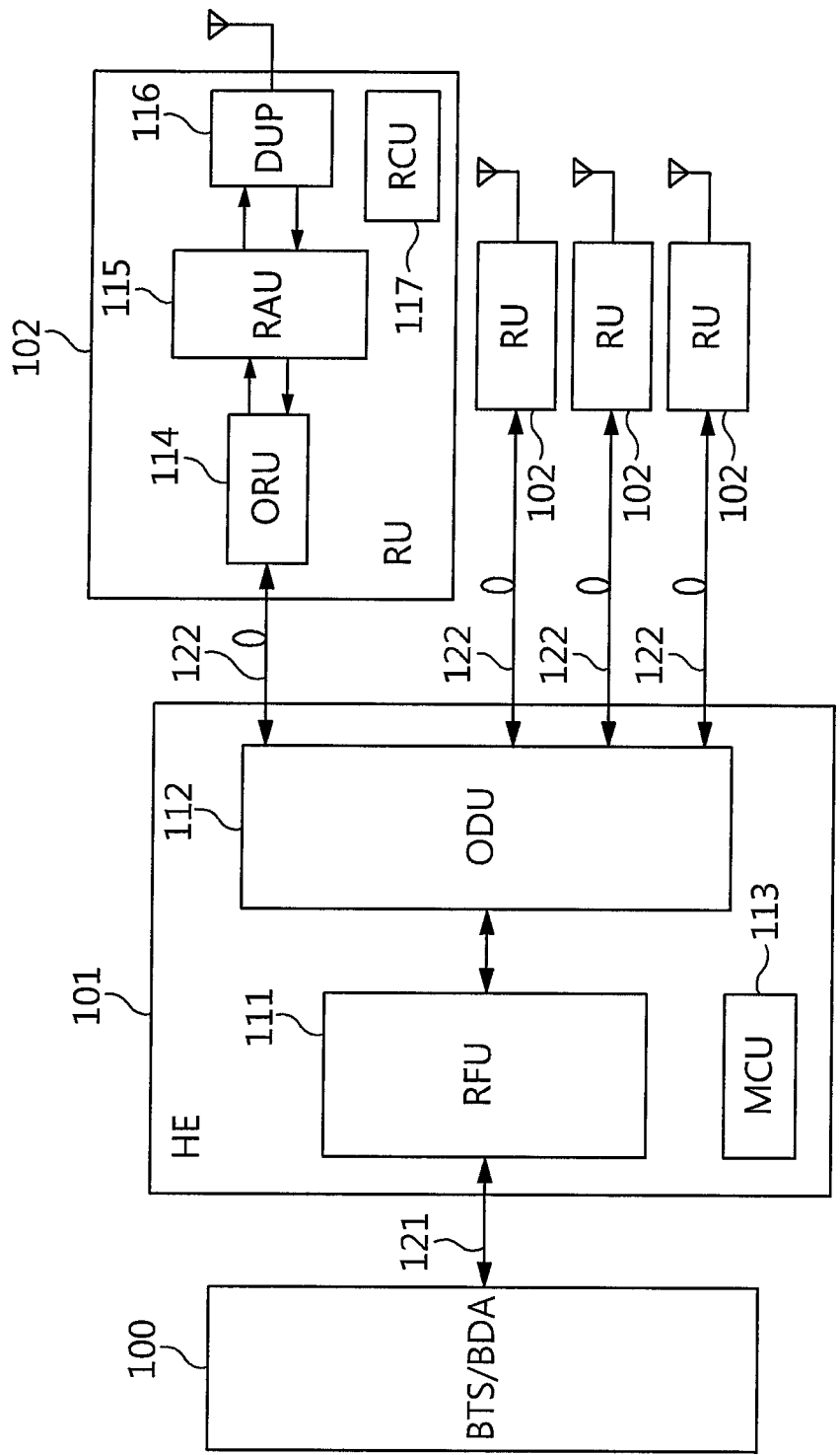
FIG. 1 is a diagram illustrating a configuration of a DAS.

Example embodiments of the present invention will be described in detail below, with reference to the accompanying drawings, to such an extent that those skilled in the art should be able to implement the technical spirit of embodiments according to the present invention. Reference now should be made to the drawings, throughout which the same reference numerals are used to designate the same or similar components. In the following description, redundant descriptions and detailed descriptions of known elements or functions that may be unnecessary to understand the thrust of the present invention may be omitted.

FIG. 1 is a diagram illustrating a configuration of a DAS. As shown in FIG. 1, a DAS may include an HE 101 and a plurality of RUs 102. The HE 101 may be coupled to a BTS/BDA 100 via an RF interface 121, and may be optically extended to the RUs 102. The RUs 102 may be coupled to the HE 101 over optical cables 122. Each of the RUs 102 may send a signal to a terminal (not shown) or receive a signal from the terminal via an antenna.

As shown in FIG. 1, the HE 101 may be interfaced with the BTS/BDA 100. The HE 101 may include an RF Unit (RFU) 111, an Optical Distribution Unit (ODU) 112, and an MCU 113. The RFU 111 may control a signal received from the BTS/BDA 100 at an appropriate gain and then send the controlled signal to the ODU 112 in a downlink direction. The RFU 111 may also control a signal received from the ODU 112 at an appropriate gain and then send the controlled signal to the BTS/BDA 100 in an uplink direction. The ODU 112 may perform Electronic/Optic (E/O) Conversion in the downlink direction, and may perform Optic/Electronic (O/E) Conversion and optic extension of the plurality of RUs in the uplink direction. The MCU 113 may monitor, report, and control the status of the RFU 111 and ODU 112 of the HE 101 and the internal status of the HE 101. The MCU 113 may also monitor, report, and control the statuses of the RUs 102 via communication with the Remote Control Unit 117 of each of the plurality of RUs 102 that have been optically extended.

As shown in FIG. 1, each of the RUs 102 may include an Optic Remote Unit 114, a Remote Access Unit (RAU) 115, a Duplexer 116, and a Remote Control Unit 117. The Optic Remote Unit 114 may be coupled to the ODU 112 via an optical cable 122 and may function to perform O/E conversion in the downlink direction and E/O conversion in the uplink direction. For example, the RAU 115 may control a downlink RF signal received from the Optic Remote Unit 114 at an appropriate gain, amplify the controlled RF signal having high output, and send the amplified RF signal to the Duplexer 116. The RAU 115 may also amplify an uplink signal received from the Duplexer 116 to a low noise signal, adjust the amplified signal to an appropriate level, and output the controlled signal to the Optic Remote Unit 114. The Duplexer 116 may also be coupled to an antenna via a feeder line (e.g., an RF coaxial cable), and may separate the downlink signal and the uplink signal from each other. The Remote Control Unit 117 may monitor and control the RAU 115 and Optic Remote Unit 114 of the RU 102.

Although the number of RUs 102 is illustrated as being four in the DAS of FIG. 1, the number of RUs 102 may be increased. Furthermore, the number of ODUs 112 may be increased using a multi-way splitter (not shown) between the RFU 111 and the ODU 112.

Figure 2:
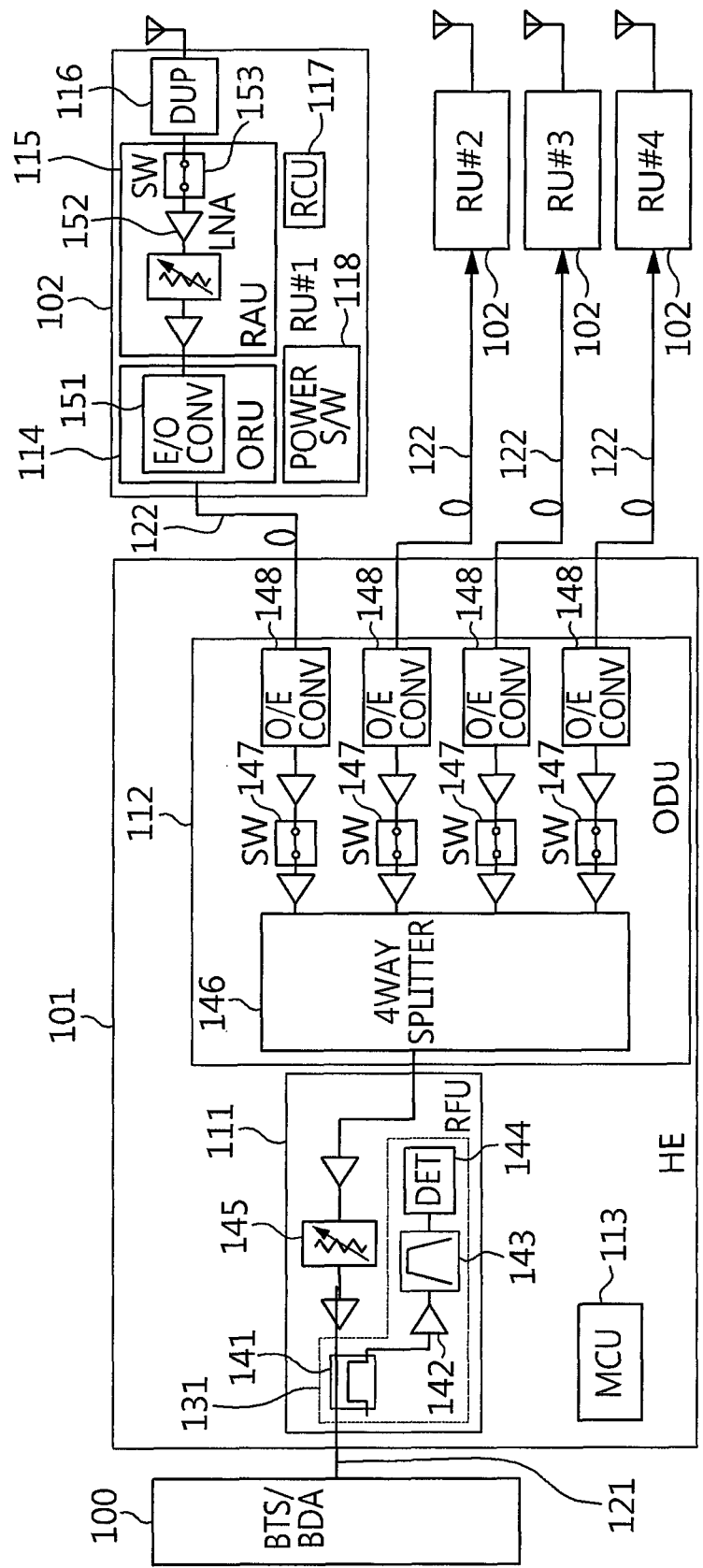
FIG. 2 is a diagram illustrating elements (e.g., blocks) of an uplink path of a DAS having four RUs, and a system for automatically measuring uplink noise level according to one embodiment of the present invention.

FIG. 2 is a diagram illustrating elements (e.g., blocks) of an uplink path of a DAS having four RUs, and a system for automatically measuring uplink noise level according to one embodiment of the present invention. A system for automatically measuring uplink noise level according to one embodiment of the present invention will now be described with reference to FIG. 2.

An uplink path according to an embodiment of the present invention will be described first. According to an embodiment, a signal generated by a user terminal (not shown) is received by an RU 102 in a corresponding service area. The received signal is controlled at an appropriate gain, is converted into an optical signal via an E/O converter 151, and is then sent to the HE 101 via the optical cable 122. The OLE converters 148 of the ODU 112 perform O/E conversion on the optical signal. The converted signal is then sent to the RF Unit 111. The RFU 111 controls the converted signal at an appropriate gain, and outputs the controlled signal to the BTS/BDA.

A DAS according to one embodiment of the present invention is a system that is configured to control the switch on/off of an uplink path for each RU link using a detection part 131 for checking the status of an uplink path, ODU link switches 147, and the RAU input switch 153 of each of the RUs 102. The detection part 131 checks the status of an uplink path by detecting the uplink noise level of an output signal at the final end of the uplink path (i.e., the output terminal of the RF Unit 111).

A system for automatically measuring an uplink noise level according to one embodiment of the present invention includes: a coupler 141, an LNA 142, a BandPass Filter 143, and a detector 144 included in a detection part 131 of the RFU 111 of the HE 101; the MCU 113 of the HE 101; ODU link switches 147 included in the ODU 112 of the HE 101; and an RAU input switch 153, an RU power switch 118 and the Remote Control Unit 117 included in each of the RUs 102.

Although the ODU link switches 147 of the ODU 112 and the RAU input switch 153 of each of the RUs 102 are illustrated in FIG. 2 as being RF switches, they may be replaced with other components such as RF attenuators if their performance is similar to that of the RF switches.

In one embodiment, the coupler 141 of the detection part 131 is included at the final end of the uplink path, and functions to couple uplink signals transferred to the BTS/BDA 100 without influencing service signals transferred from the RFU 111 to the BTS/BDA 100.

The LNA 142 may receive the uplink signals coupled by the coupler 141, and perform low-noise amplification on the uplink signals up to a level at which the noise level can be measured.

The BandPass Filter 143 may improve the accuracy of noise level detection by passing only a particular band (e.g., only the necessary band) of the noise signal, amplified by the LNA 142, therethrough.

The detector 144 may function to measure the uplink noise level of the uplink signal amplified by the LNA 142 and report the measured noise level to the MCU 113.

The MCU 113 may function to control the ODU link switches 147, the RAU input switches 153, and the RU power switches 118 while communicating with the Remote Control Unit 117 of each RU 102. In addition, the Master Control Unit 113 may determine whether a problem has occurred in an uplink path by comparing the uplink noise level received from the detector 144 of the detection part 131 with an upper limit threshold value and a lower limit threshold value, and issuing an alarm when a problem occurs.

The MCU 113 may also function to store the alarm status of an uplink path and a measured uplink noise level for each RU in its internal memory, and an operator may access the MCU 113 and check the health status of an uplink path for each RU.

The ODU link switches 147 may be located in (or placed in) the ODU 112, and may function to individually switch on/off links between the HE 101 and the respective RUs 102 coupled to the ODU 112 over the optical cables 122.

Each RAU input switch 153 may be located at (or placed at) the input terminal of each RU 102, and may function to switch on/off a path coupled to the antenna. When the path is switched on, the RAU input switch 153 is coupled to the antenna. When the path is switched off, the RAU input switch 153 is uncoupled (or disconnected) from the antenna path for an external signal. The RAU input switch 153 may also identify a self-oscillation status, external spurious signal inflow status, and reduced (or low) gain status using the above function.

The RU power switch 118 may function to switch off the RU by blocking the power of the RU when the status of a corresponding uplink path for the RU link is abnormal or bad (e.g., when a self-oscillation status, external spurious signal inflow status, or reduced gain status is identified).

The RU power switch 118 may also function to block the power of an uplink path in the RAU 115. However, other components such as an RF attenuator or an RF switch capable of blocking the uplink path of the RAU 115 may be used instead of the power switch 118.

Figure 3:
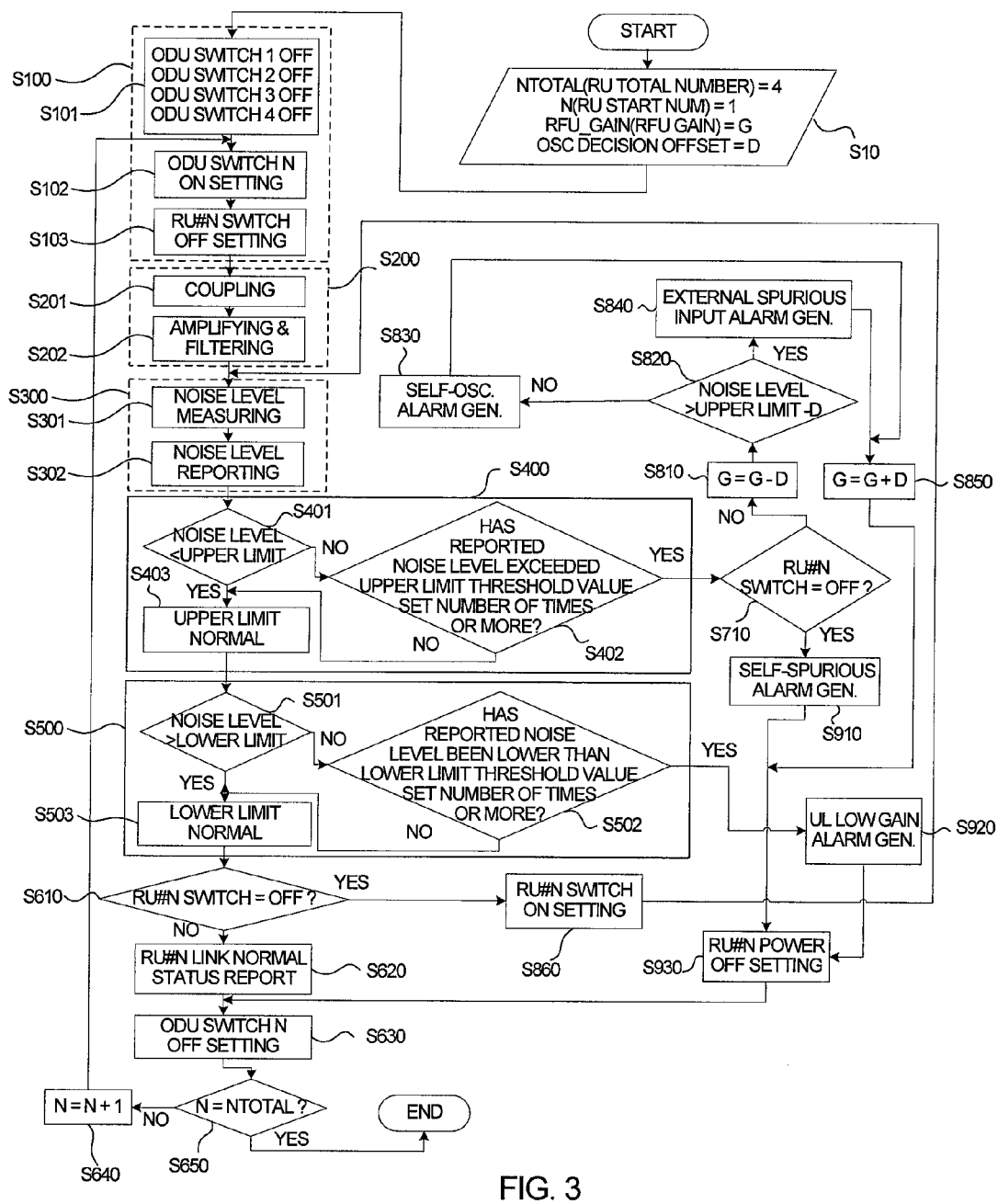
FIG. 3 is a flowchart illustrating a method of automatically measuring an uplink noise level of a DAS according to one embodiment of the present invention.

FIG. 3 is a flowchart illustrating a method of automatically measuring an uplink noise level of a DAS according to one embodiment of the present invention. Accordingly, a method of automatically measuring an uplink noise level of a DAS according to one embodiment of the present invention is described below with reference to FIG. 3.

A method of automatically measuring an uplink noise level of a DAS according to one embodiment of the present invention includes the RU link-based switch control step S100; uplink noise level extraction step S200; noise level detection step S300; and comparison and determination steps S400 and S500.

According to an embodiment, in the RU link-based switch control step S100, only the ODU switch and the link of an RU to be measured are switched on, and the remaining RU links are switched off. For example, the RU link-based switch control step S100 may include step S101 of switching off all the ODU link switches 147 coupled to the RUs 102, step S102 of switching on one of the ODU link switches 147 for the link of an RU to be measured, and step S103 of switching on the RAU input switch 153 of the RU 102 to be measured.

The uplink noise level extraction step S200 includes coupling step S201 and step S202 of amplifying and filtering coupling signals. The noise level detection step S300 includes noise level measurement step S301 and noise level report step S302. The comparison and determination steps S400 and S500 include upper limit comparison and determination step S400 and lower limit comparison and determination step S500.

For example, in a method of automatically measuring an uplink noise level of a DAS according to one embodiment of the present invention, the ODU link switches 147 for sequentially switching on/off all the RU links are included in the ODU 112, and the coupler 141, the LNA 142, the BandPass Filter 143, and the detector 144 are included at the final end of the uplink path of the DAS. The uplink noise level is extracted from the RU links at step S200. The extracted uplink noise level is measured at step S301 and the measured noise level is reported to the MCU 113 at step S302. The measured noise level is compared with a threshold value (e.g., a preset threshold value) in order to determine whether the status of a path is normal or abnormal, and abnormal factors are checked and reported to an operator.

In a method of automatically measuring an uplink noise level of a DAS according to one embodiment of the present invention, first, the ODU 112 performs the RU link-based switch control step S100 of individually switching on/off links coupled to the RUs 102. For example, the HE 101 and only the first RU link, selected from among the links of the plurality of RUs 102, may be switched on, and the remaining RU links are switched off. The uplink noise level of the first RU link is measured and the first RU link is then switched off. Next, a second RU link is switched on, the uplink noise level of the second RU link is measured, and the second RU link is then switched off. Likewise, all the RU links may be sequentially switched on/off so that uplink noise levels of the links of all the RUs 102 are measured.

When a specific RU link is switched on, the final end of the uplink path performs the uplink noise level extraction step S200. For example, the coupler 141 couples the uplink noise signals at step S201, and the LNA 142 amplifies the levels of the uplink noise signals to a measurable level and filters them at step S202. According to an embodiment, the filtering step S202 functions to improve the accuracy of noise level measurement.

After the levels of the coupled uplink noise signals have been amplified and filtered at step S202, the detector 144 measures the uplink noise levels at step S301 and then reports the measured noise levels to the MCU 113 at step S302.

The comparison and determination steps S400 and S500 include the upper limit comparison and determination step S400 and the lower limit comparison and determination step S500.

At the upper limit comparison and determination step S400, the MCU 113 determines whether a reported noise level is higher than an upper limit threshold value (e.g., a preset upper limit threshold value) at step S401. If, as a result of the determination, the reported noise level is determined to be higher than the upper limit threshold value (e.g., the preset upper limit threshold value), the MCU 113 determines whether the reported noise level has exceeded the upper limit threshold value a set number of times or more at step S402. If, as a result of the determination at step S402, the reported noise level is determined to have exceeded the upper limit threshold value the set number of times or more, the MCU 113 determines whether the RAU input switch 153 of the corresponding RU is switched off at step S710. If, as a result of the determination at step S710, the RAU input switch 153 is determined to be switched off, the MCU 113 determines that the status of the RAU input switch 153 is a self-spurious abnormal status, generates an alarm at step S910, and then switches off the RU power switch 118 of the RU at step S930.

However, if, as a result of the determination at step S710, the RAU input switch 153 is determined not to be switched off, the MCU 113 lowers the gain (e.g., the preset gain) of the RFU 111 by an offset (e.g., a specific offset) D at step S810 and determines whether the uplink noise level is higher than a value (i.e., higher than the upper limit value—the offset value D) at step S820 in order to determine whether the status of the RAU input switch 153 is a self-oscillation status or an external spurious signal input status.

If, as a result of the determination at step S820, the uplink noise level is determined to be higher than the value (i.e., higher than the upper limit value—the offset value D), the MCU 113 determines that the status of the RU link is an external spurious input status. The MCU 113 generates an external spurious input alarm at step S840, restores the gain of the RFU 111 at step S850, switches off the corresponding RU 102 at step S930, and then proceeds to the next step.

However, if, as a result of the determination at step S820, the uplink noise level is determined not to be higher than the value (i.e., not higher than the upper limit value—the offset value D), the MCU 113 determines that the status of the corresponding RU link is a self-oscillation status attributable to insufficient antenna isolation. The MCU 113 generates a self-oscillation alarm at step S830, restores the gain of the RFU 111 at step S850, switches off the corresponding RU 102 at step S930, and then proceeds to the next step.

At the upper limit comparison and determination step S400, the MCU 113 compares the uplink noise level, reported at S302, with the upper limit threshold value (e.g., the preset upper limit threshold value) at S401. If, as a result of the comparison, the reported noise level is lower than the upper limit threshold value or the reported noise level has not exceeded the upper limit threshold value the set number of times, the MCU 113 does not generate an alarm and determines that the RU link is normal at S403 and proceeds to the lower limit comparison and determination step S500.

According to an embodiment, only when the RU link is determined to be normal (S403) at the upper limit comparison and determination step S400 may the MCU 113 proceed to the lower limit comparison and determination step S500.

At the lower limit comparison and determination step S500, the MCU 113 determines whether the reported noise level is higher than a lower limit threshold value (e.g., a preset lower limit threshold value) at S501. If, as a result of the comparison, the reported noise level is determined not to be higher than the lower limit threshold value, the MCU 113 determines whether the reported noise level has been lower than the lower limit threshold value a set number of times or more at S502. If, as a result of the comparison at step S502, the reported noise level is determined to have been lower than the lower limit threshold value the set number of times or more, the MCU 113 generates an uplink reduced (or low) gain alarm for the corresponding RU link at S920, switches off the RU at S930, and then proceeds to the next step.

In the lower limit comparison and determination step S500, the MCU 113 compares the uplink noise level, reported at step S302, with the lower limit threshold value (e.g., the preset lower limit threshold value) at S501. If, as a result of the comparison, the reported noise level is higher than the lower limit threshold value (e.g., the preset lower limit threshold value) or the reported noise level has not been lower than the lower limit threshold value the set number of times or more, the MCU 113 does not generate an alarm, determines that the RU link is normal at S503, and then proceeds to the next step.

In FIG. 3, the upper limit comparison and determination step S400 is illustrated as being performed prior to the lower limit comparison and determination step S500. However, in other embodiments of the present invention the lower limit comparison and determination step S500 may be performed prior to the upper limit comparison and determination step S400.

Furthermore, in one embodiment of the present invention, both the lower limit comparison and determination step S500 and the upper limit comparison and determination step S400 are illustrated as being performed, but embodiments of the present invention are not limited thereto. For example, only one of the upper limit comparison and determination step S400 or the lower limit comparison and determination step S500 may be performed. Furthermore, the upper and lower limit comparison and determination steps may be performed concurrently (e.g., at the same time) according to a method of determining whether an uplink noise level at the final end of an uplink path falls within a threshold range (e.g., a preset threshold range) in order to monitor abnormality in the uplink path.

Furthermore, in one embodiment of the present invention, the noise level may be automatically measured at the request of an operator, or during every time cycle, or at a particular point in time (e.g., a preset time).

Furthermore, in one embodiment of the present invention, if the uplink noise level does not comply with a criterion according to the upper limit comparison and determination step S400 or the lower limit comparison and determination step S500 and an alarm is generated, only a normal or abnormal status for each RU link may be reported. However, embodiments of the present invention are not limited thereto, and uplink noise levels for each of the RU links may be stored in a database in a specific form or may be represented in other forms according to circumstances.

According to an aspect of the present invention, a noise level for each of the RU links in the DAS can be checked anywhere not only in the HE, but also using a web GUI coupled to the HE via the web, in order to determine whether an uplink path is normal and whether the uplink path is in an uplink reduced (or low) gain status, external spurious signal input status, or self-oscillation status. Accordingly, an operator does not need to visit all the RUs coupled to the HE to detach an antenna feeder cable from each of the RUs and terminate the antenna port of the RU. Operating costs may therefore be reduced (or saved), and problems can be more rapidly addressed.

Furthermore, according to another aspect of the present invention, when a problem occurs in an uplink path of the DAS, the status of an abnormal RU in a remote place may be checked or the HE may be checked via a web GUI, before a service subscriber files a complaint. Accordingly, the problem may be addressed on the spot more accurately and promptly. Furthermore, according to yet another aspect of the present invention, the call quality of a service subscriber terminal and the service quality of a DAS may be maintained because measures may be taken more promptly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of automatically measuring noise levels of a plurality of uplink paths in a Distributed Antenna System (DAS), the DAS comprising a head end, a plurality of remote units (RUs) connected to the head end, a plurality of first switches at the head end for respectively connecting each of the plurality of uplink paths between the head end and each RU of the plurality of RUs, a second switch between each RU of the plurality of RUs and a corresponding antenna for receiving external signals, and a central control unit configured to determine respective statuses of the plurality of uplink paths, to control the first switches at the head end for switching each of the plurality of uplink paths on or off, and to control the second switches between each RU and the corresponding antennas, method comprising:

switching off all of the plurality of uplink paths;
sequentially switching on each uplink path of the plurality of uplink paths individually while other uplink paths of the plurality of uplink paths is switched off to separately measure a noise level of each uplink path;
wherein when each uplink path of the plurality of uplink paths is sequentially switched on, the method further comprises:
extracting the noise level of the uplink path at a final end of the uplink path;
detecting the noise level of the uplink path; and
determining a status of the uplink path by comparing the detected noise level with a threshold value, and
wherein when the detected noise level of one of the plurality of uplink paths is abnormal compared to the threshold value, a status of the second switch between the RU and the corresponding antenna associated with the one uplink path is determined for determining an abnormal status type of the one uplink path.

2. The method of claim 1, wherein when a first uplink path of the plurality of uplink paths is sequentially switched on, the extracting the noise level of the first uplink path comprises:

coupling the noise level of the first uplink path; and
amplifying the coupled noise level to a measurable level and filtering the amplified noise level.

3. The method of claim 1, wherein when a first uplink path of the plurality of uplink paths is sequentially switched on, the detecting the noise level of the first uplink path comprises:

measuring the extracted noise level; and
reporting the measured noise level.

4. The method of claim 3, further comprising displaying the reported noise level.

5. The method of claim 4, wherein the reported noise level is displayed via a Graphic User Interface.

6. The method of claim 1, wherein when a first uplink path of the plurality of uplink paths is sequentially switched on, the determining the status of the first uplink path comprises comparing the detected noise level with an upper limit threshold value, and determining that the first uplink path is abnormal if the detected noise level exceeds the upper limit threshold value, and determining that the uplink path is normal if the detected noise level does not exceed the upper limit threshold value.

7. The method of claim 1, wherein when a first uplink path of the plurality of uplink paths is sequentially switched on, the determining the status of the first uplink path comprises comparing the detected noise level with a lower limit threshold value, and determining that the first uplink path has an abnormal reduced gain if the detected noise level is less than the lower limit threshold value, and determining that the uplink path has a normal reduced gain if the detected noise level is not less than the lower limit threshold value.

8. The method of claim 6, wherein the comparing the detected noise level with the upper limit threshold value comprises:

determining an external spurious signal input status or a self-oscillation status when the switch between the RU and the corresponding antenna associated with the first uplink path is on and the detected noise level exceeds the upper limit threshold value; and determining an internal spurious abnormal status when the switch between the RU and the corresponding antenna associated with the first uplink path is off and the detected noise level exceeds the upper limit threshold value.

9. The method of claim 8, wherein the determining the external spurious signal input status or the self-oscillation status comprises:
lowering an uplink gain of the DAS by an offset;
comparing the noise level with a comparison value obtained by reducing the upper limit threshold value by the offset; and
determining the external spurious signal input status if the noise level is higher than the comparison value and determining the self-oscillation status if the noise level is not higher than the comparison value.

10. The method of claim 9, further comprising:
generating an external spurious input alarm if the status of the first uplink path is determined to be the external spurious signal input status; and
generating a self-oscillation alarm if the status of the first uplink path is determined to be the self-oscillation status.

11. The method of claim 10, wherein the method further comprises switching off power of the corresponding RU when the external spurious input alarm or the self-oscillation alarm is generated.

12. The method of claim 7, further comprising generating an uplink low gain alarm if the first uplink path is determined to have the abnormal reduced gain.

13. The method of claim 12, wherein the method further comprises switching off power of the corresponding RU after the uplink low gain alarm is generated.

14. The method of claim 1, further comprising:
receiving a request to measure the noise level of an uplink path of the plurality of uplink paths;
automatically measuring the noise level in real time; and
reporting the measured noise level.

15. The method of claim 1, wherein the noise levels are automatically measured and reported periodically according to a time cycle or at a specific time.

16. A Distributed Antenna System (DAS), comprising:
a head end;
a plurality of remote units (RUs) connected to the head end via respective uplink connection links;
a plurality of first switches at the head end configured to independently control the respective uplink connection links between the head end and the plurality of RUs;
a coupler configured to couple at a final end of an uplink path at the head end of the DAS for transmitting a plurality of uplink noise signals corresponding to each respective uplink connection link between the head end and each of the plurality of RUs;
a low noise amplifier (LNA) configured to perform low-noise amplification of the uplink noise signals coupled by the coupler;
a bandpass filter (BPF) configured to filter the amplified noise signals received from the LNA;
a detector configured to detect the noise signals received from the LNA and the BPF; and
a central control unit configured to determine a status of each of the respective uplink connection links, to control the first switches for turning each of the respective uplink connection links between the head end and the plurality of RUs on or off, and to control second switches between each of the plurality of RUs and corresponding antennas for each of the plurality of RUs for receiving external signals.

17. The DAS of claim 16, further comprising an alarm generation unit configured to generate an alarm when a status of the uplink path is an abnormal status, and a power switch configured to switch off the alarm.

* * * * *

UNITED STATES PATENT AND TRADEMARK OFFICE
CERTIFICATE OF CORRECTION

PATENT NO. : 9,603,032 B2
APPLICATION NO. : 13/831508
DATED : March 21, 2017
INVENTOR(S) : Young-Hoon Ko Page 1 of 1

It is certified that error appears in the above-identified patent and that said Letters Patent is hereby corrected as shown below:

Column 10, Line 4, in Claim 1          After "antennas," insert -- the --

Signed and Sealed this
Eighteenth Day of September, 2018

Andrei Iancu
*Director of the United States Patent and Trademark Office*